United States Patent [19]

Defendini et al.

[11] Patent Number: 5,244,557
[45] Date of Patent: Sep. 14, 1993

[54] METHOD FOR FORMING ELECTROCHROMIC GLAZINGS

[75] Inventors: Francis Defendini, Rueil Malmaison; Christian Padoy, Gonesse; Jean-Claude Cornut, Gradignan; Doris Schoolmann, Bordeaux; Jean-Claude Lassegues, Pessac, all of France

[73] Assignee: Saint Gobain Vitrage International, Courbevoie, France

[21] Appl. No.: 757,152

[22] Filed: Sep. 10, 1991

[30] Foreign Application Priority Data

Sep. 14, 1990 [FR] France .................. 90 11419

[51] Int. Cl.⁵ .................................. C23C 14/34
[52] U.S. Cl. ...................... 204/192.29; 204/192.26; 427/108; 427/126.3; 427/165; 359/274
[58] Field of Search .................. 204/192.14, 192.15, 204/192.29, 192.26; 427/126.3, 162, 164, 165; 29/25.03, 592.1; 359/274

[56] References Cited

U.S. PATENT DOCUMENTS

| 4,347,265 | 8/1982 | Washo | 427/165 X |
| 4,558,924 | 12/1985 | Sautter | 350/357 |
| 5,019,420 | 5/1991 | Rauh | 427/162 X |

FOREIGN PATENT DOCUMENTS

0338876 10/1989 European Pat. Off. .
61-006627 1/1986 Japan .

Primary Examiner—Nam X Nguyen
Attorney, Agent, or Firm—Pennie & Edmonds

[57] ABSTRACT

A method for forming an electrochromic glazing system which comprises means to reduce and preferably eliminate all trapped air from the system so as to avoid the formation of undesirable air bubbles trapped therein. The method comprises coating at least a portion of an inner surface of a first glass support sheet with a transparent electroconductive layer, followed by a layer of an electrochromic material which serves as an electrode. A second glass support sheet is also coated upon its inner aspect with an electroconductive layer, upon which is coated a counterelectrode layer. Thereafter, an electrolyte layer is deposited upon either the electrochromic, i.e., electrode layer, or the counterelectrode layer. The two coated glass support plates thereafter are preassembled, that is, they are oriented one above the other with their uncoated surfaces facing outwardly such that their coated portions are adjacent, but not in contact, with each other. A spacer, which ultimately serves as a peripheral seal for the glazing, keeps the two coated stacks apart during the preassembly stage. The area between the two stacks is then subjected to a vacuum to remove substantially all of the air therefrom. The glazing is thereafter subjected to an assembly stage in which the coated support plates are heated and then pressed together to from the completed glazing. The invention additionally relates to an apparatus for forming the glazings of the invention and to the glazings formed thereby.

11 Claims, 4 Drawing Sheets

METHOD FOR FORMING ELECTROCHROMIC GLAZINGS

TECHNICAL FIELD

The invention relates to a method and an apparatus for forming variable transmission electrochromic glazings, as well as to the electrochromic glazings formed thereby.

BACKGROUND OF THE INVENTION

Electrochromic glazings are coated glass laminate structures wherein light transmission through the laminate structure is modified by application of an electrical potential difference across the glazing. Glazings of this type are often used, for example, in motor vehicles, particularly as sun roofs, since their use permits a degree of control over the amount of solar energy entering the vehicle's passenger compartment.

Such glazings typically comprise a first ("top" or "upper") and a second ("bottom" or "lower") glass support sheet which define the outer surfaces of the glazing. Coated upon an inner (with respect to the laminate) surface of each support sheet is a transparent electroconductive layer. These coated glass support sheets are further successively separated by: 1) a layer of an electrochromic material, which functions as an electrode, 2) an electrolyte layer and; 3) a counterelectrode layer. The counterelectrode layer may, if desired, be formed from an electrochromic material. An electrical power lead is inserted into each of the electroconductive layers.

Thus, upon the application of an electric current to the system, an electrical field is created, resulting in the reversible insertion of cations (provided by the electrolyte layer) into the electrochromic layer. As a result, an electrochemical reaction occurs within the electrochromic material, wherein this material shifts from a first oxidative state to a different oxidative state. As shown below, this oxidation state change induces a corresponding color change within the electrochromic material. For example, when tungsten oxide is used as the electrochromic material, the reversible reaction proceeds as follows:

$$WO_3 + xM^+ + xe^- \leftarrow M_xWO_3$$

(colorless) (midnight blue)

wherein $M^+ = H^+, Li^+, Na^+, K^+$.

Although, as noted above, the electrolyte layer is the source of the cations necessary for the reaction, it is the counterelectrode layer which permits the $M^+$ cations to move back and forth between the electrolyte and electrochromic layers within the glazing.

In forming electrochromic glazings of the type described above by the methods used in the prior art, a first glass support sheet is coated upon at least a portion of its inner surface, i.e., the side facing the interior of the laminate, with a transparent electroconductive layer and a layer of an electrochromic material. A second glass support sheet is also coated on an inner portion thereof with a transparent electroconductive layer, as well as with a counterelectrode layer. An electrolyte layer is then coated either upon the electrochromic material or the counterelectrode layer on the first or second sheets, respectively. Thereafter, the stacked layers coated onto the two glass sheets are sandwiched together into a laminate such that the uncoated portions of the first and second glass support sheets define the outer, i.e., top and bottom, surfaces of the glazing.

As shown for example, in European Patent Publication No. 338 876, the prior art assembly operation described above is typically carried out by positioning the two coated support plates such that the coated layers abut against one another, then heating the layer stack under pressure at a sufficiently high temperature so that the electrolyte, which has an ion conductive polymer base, becomes adherent. The pressure used ranges, for example, between $5 \cdot 10^5$ Pa and $6 \cdot 10^5$ Pa at a temperature of 85° C. Thereafter, the two coated support plates are sandwiched together to form the laminated glazing. Further, upon completion of this heat treatment, a seal is placed around the periphery of the glazing to prevent contamination of the electrolyte layer by water vapor from the surrounding atmosphere.

One major drawback to the use of this prior art process however, is that it results in the formation of bubbles visible to the naked eye within the glazing. These bubbles are often not initially seen but rather, they gradually appear over time and are particularly visible in the colored phase of the electrochromic material. This effect has been further demonstrated by aging tests wherein the formation of the bubbles is accelerated by subjecting glazings of the type described above to elevated temperatures, such as might occur with an automobile sunroof exposed to the rays of the sun. Such bubbles are clearly undesirable in that they have an obviously negative aesthetic effect.

It has been determined by an analysis of these bubbles that their composition is very close to that of the air in the zone wherein the glazing is formed. The source of these bubbles is therefore believed to be that air which becomes trapped in the electrochromic system during the assembly process. The trapped air remains invisible at first because it is in the form of microbubbles. However, as time passes and the glazing is exposed to elevated temperatures, e.g., such as caused by the rays of the sun striking the surface of the glazing, these microbubbles coalesce and become visible, thus marring the appearance of the entire glazing.

It has therefore been desired for some time by those working in this field to develop a method and apparatus for forming electrochromic glazings of the type described above which prevents the formation of bubbles therein and thus to produce a glazing whose surface is not marred by such bubbles.

SUMMARY OF THE INVENTION

One object of the present invention is therefore to provide a method and apparatus for forming an electrochromic glazing in a manner to reduce and preferably entirely eliminate all trapped air from the system, so as to avoid the formation of undesirable air bubbles within the glazing.

A further object of the invention is to provide an improved electrochromic glazing, without such air bubbles, by the process described herein.

According to the method of the invention, a first glass support plate is coated upon at least a portion of an inner (i.e., relative to the laminate structure) surface thereof with a transparent electroconductive layer, followed by a layer of an electrochromic material stacked thereupon which serves as an electrode. The inner surface of a second glass support plate is also coated with a transparent electroconductive layer, upon which is stacked a counterelectrode layer. Thereafter, an electrolyte layer is deposited between the electrochromic (electrode) layer and the counterelectrode layer by being coated upon, optionally, one or the other of these two layers.

In a following stage, known as the "preassembly stage", the two coated support plates are then oriented one above the other with their uncoated surfaces facing outwardly, such that the electrolyte layer of one stack is closely adjacent, but not in contact with, the corresponding counterelectrode or electrochromic (electrode) layer of the other stack, i.e., on the order of about 2 to about 10 mm apart. To keep the two coated support plates separated a distance apart during the preassembly stage, a spacer is positioned along the inner peripheral surface of one of the plates. This spacer, as described below, also serves to seal the glazing, i.e., it prevents water vapor from penetrating the glazing and interfering with its operation. The spacer also ensures that sufficient space is left between the layer stacks to permit the evacuation of the air between them prior to and/or during, the assembly operation.

Once the coated support plates are in the position described above, the space between them is subjected to a vacuum to remove substantially all the air which may be trapped therein.

The preassembly stage thus makes it possible, before putting the two coated layer stacks into actual contact, to evacuate the air trapped at the surface of the electrolyte layer, i.e., in the interface between the electrolyte layer and the counterelectrode, prior to a subsequent assembly step.

Once the air has been removed by the vacuum, the glazing undergoes an "assembly stage" in which the layer stacks are heated to render the electrolyte layer tacky. Then, the two layer stacks are pressed together to form the completed glazing. The glazing is then cooled and removed from the assembly chamber. The resultant glazings provided by the above-described process have been found to be substantially, if not entirely, free of undesirable air bubles, even after exposure for an extended time to the effects of solar radiation.

Several alternate embodiments of the process described above have also proved advantageous. For example, the duration of the vacuum stage may be extended for a sufficient period to at least partially degas the air actually dissolved within the electrolyte layer, in addition to the air at the surface of this layer as described above. Moreover, this degassing phase may be rendered still more efficient when the assembly, including the electrolyte, is heated during the degassing process.

Further, the heating stage of the assembly process may also be carried out under vacuum conditions, once the air at the surface of the electrolyte is eliminated and optionally the degassing of the electrolyte is performed. This practice serves to remove additional trapped gas from the system. Thus, both the pre-assembly and assembly stages may be performed under vacuum conditions to minimize any risk of trapping air in the glazing.

Advantageously, the spacer used with the invention is a thermoplastic cord which is sufficiently rigid at room temperature to be able to separate the two layer stacks. The material of which the cord is formed should, however, also be capable of flowing at elevated temperatures so that during the final assembly of the glazing, which involves heating, the cord fills the entire peripheral boundary around the two sandwiched layer stacks. Its thickness is thus reduced by the effect of the elevated temperature.

The use of a spacer to form the electrochromic glazing of the invention in the manner indicated provides a very substantial advantage over the prior art process described above. That is, the spacer forms a final, continuous seal between the two coated support plates upon completion of the assembly phase. Thus, not only is it unnecessary to remove the spacer upon completion of the assembly process, but the spacer also acts as a permanent sealing barrier protecting the electrolyte by reinforcing or even replacing an outer seal which would otherwise be required to be added in a separate assembly step.

In one embodiment of the invention, the spacer has a butyl rubber and/or polyisobutylene base, the presence of polyisobutylene making it possible to obtain a cord which is particularly responsive to changes in temperature, i.e., whose dimensions are affected by changes in temperature in a known, reproducible manner. Moreover, the spacer for use with the invention may further be rendered steamtight, as well as watertight, if a drying agent such as a molecular sieve is integrated therein.

The preferred electrolyte for use with the invention is an ion conducting polymer. Such polymers, which are discussed in greater detail below, are applied in a relatively thick layer to ensure formation of a continuous conductive layer, thus avoiding problems which may otherwise occur due to discontinuities in the layer. The use of such electrolyte materials also permits the use of assembly techniques analogous to those used for a long time in the electrochromic glazing industry and which are relatively simple to use. In addition, within the framework of the invention, the use of such a relatively great layer thickness makes it possible to free a sufficient space to house the thermoplastic cord after it has flowed.

An alternate embodiment of the invention concerns the formation of an electrochromic safety glazing wherein one of the two glass support sheets is itself replaced by a laminate. Thus, such a system comprises, in total, three glass sheets, i.e., an "outer" glass sheet fused, for example, with the use of an intervening sheet of polyvinyl butyryl, to an uncoated "outer" surface of one glass support sheet of a laminated electrochromic glazing as described above. In this embodiment, the "inner glass sheet", i.e., that which is located within the laminate and fused to the outer sheet, is smaller in dimension than the two outer glass sheets. A first spacer is located between the two outer glass sheets. Optionally, a second spacer may be positioned between the two glass sheets of the electrochromic system itself.

The use of a second spacer as described above makes it possible to ensure the complete filling, during the coating of the glass support plates, of the peripheral space left free between the two outer glass sheets, as well as between the outer sheet and the inner sheet forming one boundary the electrochromic system.

A still further embodiment of the invention relates to an apparatus for use in both the preassembly and the assembly of the electrochromic glazing of the invention. The use of the apparatus of the invention thus avoids any need to handle the glazing between these two stages, which was necessary in the prior art.

The apparatus comprises an enclosure having two chambers separated by a flexible membrane. Both of these chambers may either be pressurized or, alternatively, subjected to a partial vacuum. The two coated glass support plates awaiting assembly are placed in one of the chambers.

The pre-assembly stage is carried out by placing both chambers under vacuum, while the assembly stage is performed by pressurizing the chamber separated by the membrane from the chamber containing the glazing. Preferably, the electrolyte layer supported upon one of the glass support sheets is heated during both stages, i.e., the pre-assembly (vacuum) stage and the assembly stage in order to ensure good adhesion between the two layer stacks. Once the glazing is assembled, it is cooled prior to removal from the assembly apparatus.

In addition, as noted above, an additional embodiment of the invention concerns an electrochromic glazing which does not contain air trapped in the interface between the electrolyte layer and the counterelectrode. Moreover, in a variation of this embodiment, the electrolyte layer itself is degassed prior to placing the layer stacks in contact with one another during the assembly stage, thus substantially ensuring that the electrolyte layer is itself free of trapped gasses that would otherwise coalesce into visible gas bubbles over time. The periphery of the glazing is sealed with the use of a thermoplastic spacer used to separate the coated support plates during the pre-assembly stage as described above.

The invention also relates, as noted above, to an electrochromic safety glazing wherein one of the coated glass supports of the glazing is formed of two glass sheets of different dimensions (i.e., wherein the inner sheet is smaller in size than the outer sheet) joined in a known manner by a polymer sheet, for example of polyvinyl butyryl. A thermoplastic seal is provided between the two outermost sheets, each of which is of the same size as the other. Such safety glazings can also be provided with an additional thermoplastic seal between the inner (i.e., smaller) glass sheet and the outer sheet belonging to the electrochromic system. These two seals, which may be fabricated from the same or different materials, constitute a double barrier which is particularly efficient for protecting the electrolyte.

The laminate of the invention may additionally comprise, moreover, an ultraviolet blocking layer inserted above the electrolyte layer to protect the electrolyte layer from the possibly harmful effects of ultraviolet light.

DETAILED DESCRIPTION OF THE PREFERRED EMBODIMENTS

A first embodiment of an electrochromic glazing formed by the process of the present invention is illustrated in FIGS. 1A and 1B. For convenience in understanding the invention, the ratios of thickness between the various layers of the system have not been drawn to scale and the electric current leads are not shown.

In the pre-assembly stage shown in FIG. 1A, the glazing of the invention comprises a first glass support sheet, 1 coated with a transparent electroconductive layer 2 preferably comprised of indium oxide doped with tin, a layer of electrochromic material 3 comprising tungsten oxide or iridium oxide, and an electrolyte layer 4 comprising a combination of polyoxyethylene and phosphoric acid. The glazing further comprises a second substrate 7 covered by a transparent electroconductive layer 6 formed from the same material as layer 2, as well as a layer of electrochromic material 5 (e.g., tungsten oxide or iridium oxide). A butyl rubber spacer cord 8 defines a space between the two coated support sheets.

Some preferred characteristics of the various elements of the electrochromic glazings of the invention are, for example, set forth below:

-- support sheets: float glass sheets having a thickness of 1.5 mm and measuring approximately 400 mm×375 mm.

-- transparent electroconductive layers: indium oxide layer doped with tin deposited by magnetron cathode sputtering, with a thickness of 400 nm, and a resistance squared of less than or equal to 5 ohms.

- - electrochromic layers: deposited by magnetron cathode sputtering:
tungsten oxide: thickness 400 nm
iridium oxide: thickness 55 nm
- - electrolyte: a solid solution of anhydrous phosphoric acid in polyoxyethylene.

Preparation of the electrolyte: under anhydrous conditions, for each liter of solvent, 21.5 gms of anhydrous phosphoric acid is dissolved, together with a polyoxyethylene of molecular weight about 5,000,000 (density 1.21; glass transition temperature $-40°$ C.; ratio of the number of oxygen atoms of the polymer to the number of hydrogen atoms of the acid equal to 0.66). The solvent is a 60/40 mixture by volume of acetonitrile and tetrahydrofuran.

The solution is thereafter drained off in an atmosphere having a controlled amount of moisture (i.e., less than or equal to 50 ppm of water) by film drawing on the substrate covered by one or the other of the layers of electrochromic material. After evaporation of the solvent at room temperature under dry air for 20 hours, a film of 50 microns was obtained whose conductivity at 20° C. was $9 \cdot 10^{-5}$ ohm$^{-1}$·cm$^{-1}$ and whose light transmission was greater than 85%.

This complex of polyoxyethylene and phosphoric acid advantageously exhibits a satisfactory electrical conductivity at room temperature. Alternately, in place of the material described above, the electrolyte layer could be comprised of, for example, a solid solution of LiC1O$_4$ in polyoxyethylene.

The two coated support plates are then ready for the pre-assembly stage. Instead of placing them directly in contact in an environment of anhydrous air as practiced in the prior art, a spacer 8 is placed therebetween, as indicated in FIG. 1A to initially keep them apart. In a preferred embodiment of the invention, the thermoplastic spacer has, for example, a viscosity on the order of 115 degrees Mooney at the end of 8 minutes at 40° C.

The spacer is preferably formed of butyl rubber and/or polyisobutylene, as described in French patent no. 1,527,165, with a rectangular (3 mm×4 mm) cylindrical cross section. The spacer 8 therefore defines a layer of air between electrolyte layer 4 and electrochromic layer 5.

Electrolyte layer 4 is preferably coated on layer 3 to within about 10 mm of the margin of layer 3. This procedure is preferred since, during the flow of spacer 8, mechanical tensions may be produced if layers 4 and 5 are permitted to overlap, which may result in breakage of the glass support plates and/or the production of short circuits within the glazing. Moreover, this free space at the margin of layer 3 is required to permit the spacer to flow freely upon heating.

Thereafter, the unit shown in FIG. 1A is then preferably subjected to a vacuum at ambient temperature at an air pressure of less than 13 Pa, and preferably 1.3 Pa for a variable period of between about 30 minutes and four hours to remove substantially all of the air from the space between the layer stacks. Good results have been obtained with a period of about 1½ hours. Moreover, this degassing treatment can be rendered still more efficient by carrying out the vacuum treatment described above at a temperature of between about 95°-140° C.

In the subsequent assembly phase, the structure is then heated in a known manner at a temperature lower than the degradation temperature of the electrolyte polymer, i.e., less than about 140° C. Here the preferred conditions are, by way of example, as follows: temperature: 95° to 140° C., pressure: $3 \cdot 10^5$ Pa to $12 \cdot 10^5$ Pa, period: 10-15 minutes. Under the combined effect of heat and pressure, the butyl rubber spacer flows to seal the periphery of the glazing. FIG. 1B illustrates the resulting assembly and the final sealing role of spacer 8.

One embodiment of the electrochromic glazing of the invention utilizes transparent electroconductive layers comprising indium oxide doped with tin. The electrolyte is preferably formed from a complex of polyoxyethylene and phosphoric acid. The electrode is preferably an electrochromic material such as tungsten oxide. The counterelectrode is also an electrochromic material such as iridium oxide. Iridium oxide offers the advantage of discoloring and recoloring simultaneously with the tungsten oxide used as the electrode, according to the reaction:

$H_xIrO_y$ ⟵ $IrO_y + xH^+ + xe^-$ (Very light brown)      (Dark brown)

and therefore this material reinforces the contrast of colors exhibited by the glazing of the invention.

Moreover, as would be readily understood by one of ordinary skill in the art, spacer 8 may be arranged upon the glass support plates in various orientations. Two preferred orientations of the spacer are illustrated in FIGS. 2 and 3 (shown prior to the preassembly phase), respectively.

Figure 2:
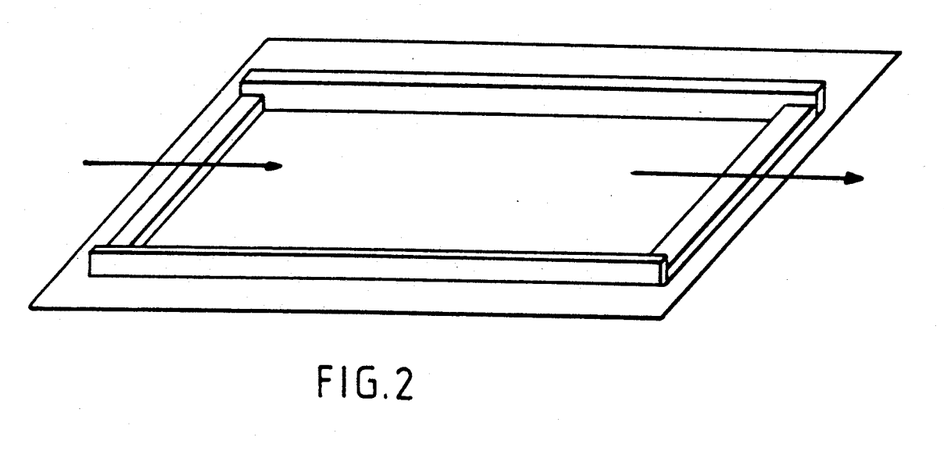
FIGS. 2 and 3 are perspective views illustrating two possible orientations of the spacer member.

In FIG. 2, the continuous spacer cord is shown located along the outer peripheral edge of one of the glass support plates on both pairs of opposed edges such that the longest portions of the cord are vertical, i.e., perpendicular, with respect to the surface of the plate, whereas, along the two remaining shorter sides of the plate, the cord is horizontal, i.e., it lays flat against the surface of the plate.

Figure 3:
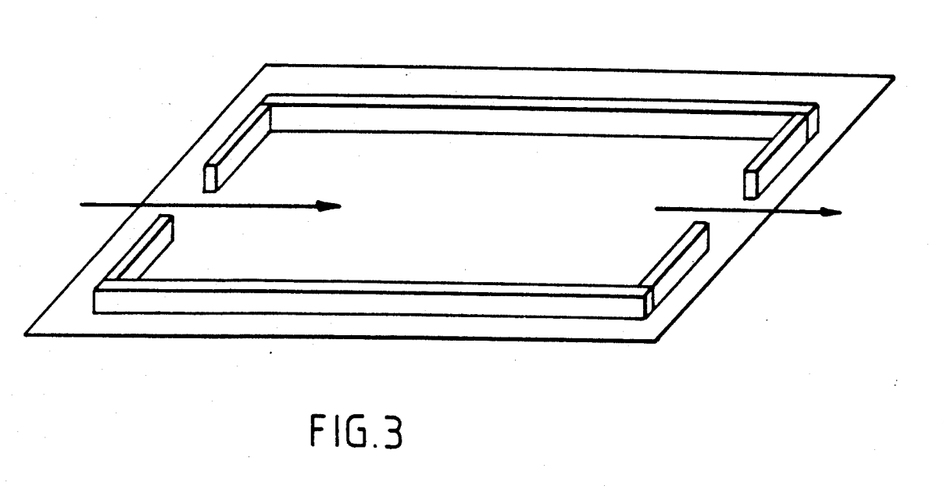

In FIG. 3, the cord is deposited in a uniform manner along each edge of the glass support plate, while leaving a gap or space along each of the "shorter" sides of the plate to facilitate removal of the air from between the coated support plates. In both cases, the object is to delimit a layer of air between the two substrates that can subsequently be evacuated during assembly with the use of a vacuum.

In one embodiment of the process of the invention, the duration of the vacuum treatment can be extended to up to about four hours by heating to a temperature less than the temperature of flow of the butyl spacer, here between 40° and 50° C., to facilitate the degassing of the polymer electrolyte. While remaining under vacuum, the glazing is then heated to the flow temperature of the butyl rubber spacer, here 95° C., during assembly of the glazing.

Figure 5:
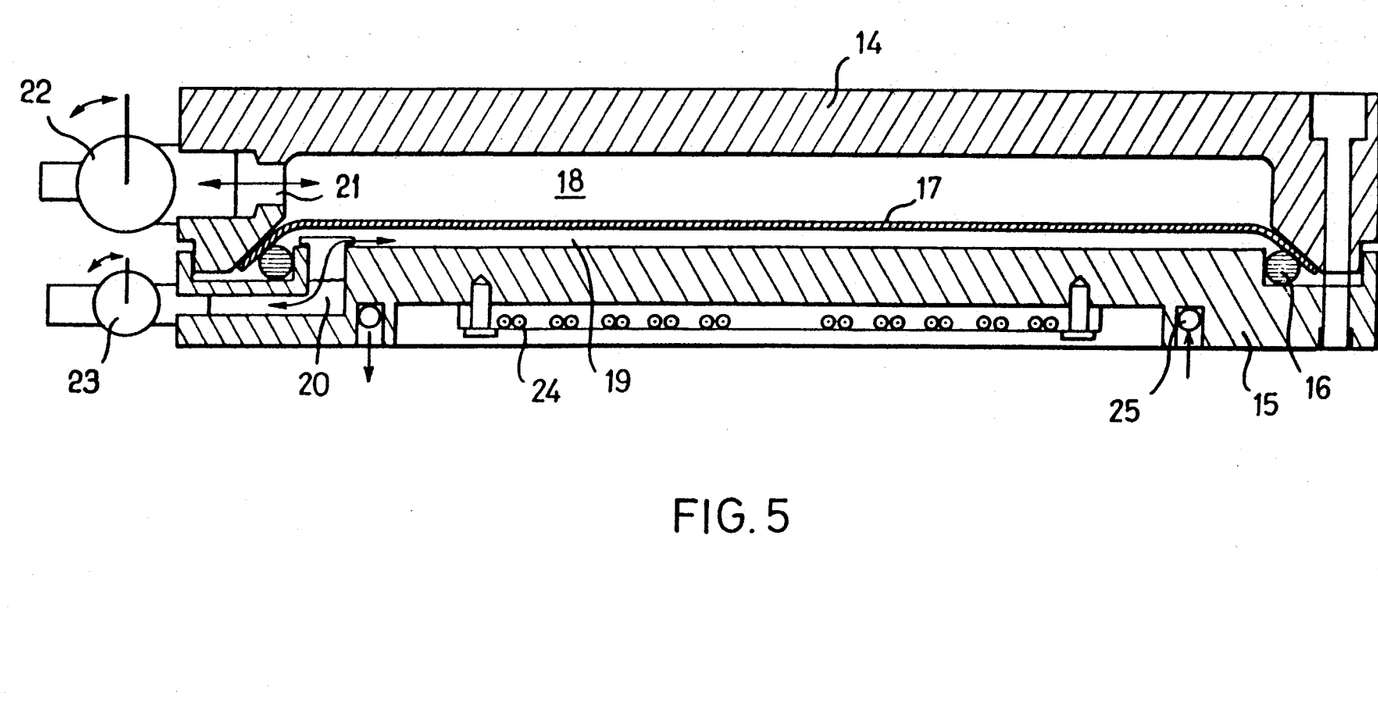
FIG. 5 is a longitudinal section view of an assembly apparatus for use in preparing an electrochromic glazing formed according to the invention.

In this connection, FIG. 5 illustrates a novel apparatus particularly suited to the application of the process according to the invention. The use of this apparatus makes it possible to both perform the preassembly step under vacuum conditions and to heat the glazing during the assembly process in a consecutive manner, without having to handle the glazing between the two stages.

The device comprises two metal disks 14, 15 formed of aluminum alloy AU 4 G defining an enclosure having a cylindrical inner space therein. This space is sealed by an O-ring 16. A membrane 17, formed of silicone and having a thickness between 1 and 2 mm, is placed between the two disks 14, 15.

Membrane 17 separates the enclosure into two chambers 18, 19, each of which, independently of the other, may be subjected to a partial vacuum or, alternately, pressurized. Each of disks 14 and 15 is equipped with an orifice 21 and 20, respectively, connected by airtight pipes to a system of valves (of which two 22, 23 are indicated in FIG. 5) for controlling the operation of suction pumps or a pressurization system (not shown) which is well known in the art and which is operatively associated with the device.

Lower disk 15 is further provided with a heating system 24 preferably comprised of a series of heating resistors whose temperature is controlled with the use of thermocouples, as well as a cooling system 25 comprising a coil of copper pipe in which water at a suitable temperature or any other cooling liquid can be circulated.

Figure 1:
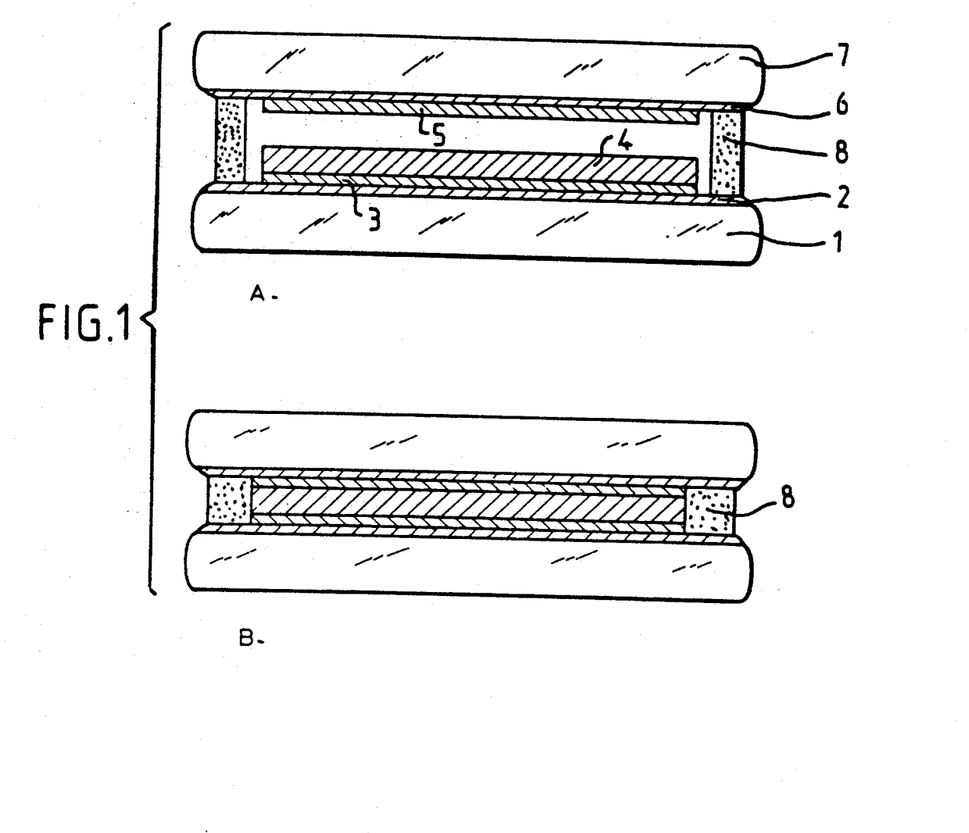
FIG. 1A is a sectional view of an electrochromic glazing formed according to the present invention during pre-assembly with a spacer member inserted between the coated glass support plates.
FIG. 1B illustrates the electrochromic glazing of FIG. 1A upon assembly of the two coated support plates.
Figure 6:
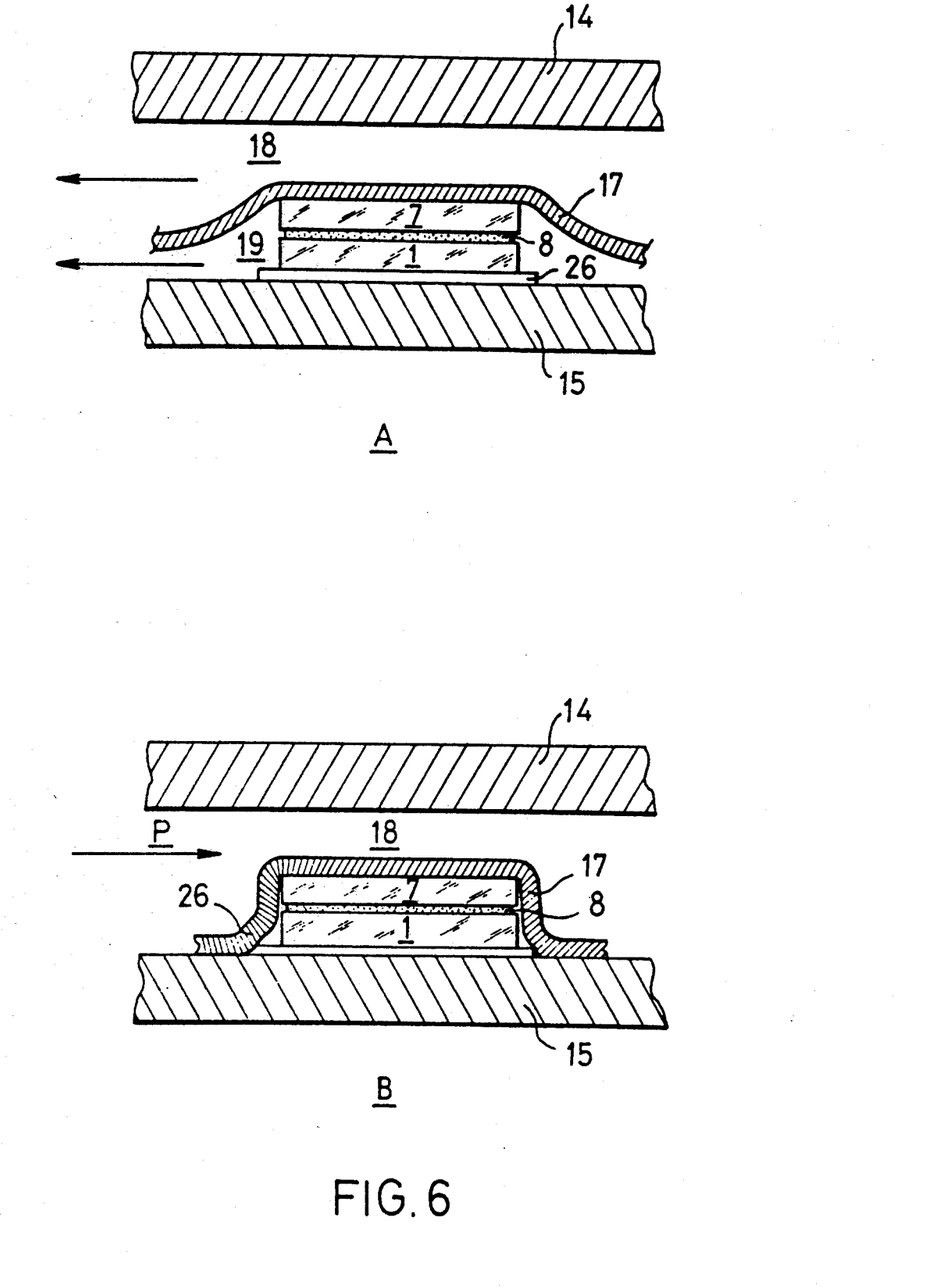
FIGS. 6A and 6B are transverse section views of the assembly apparatus shown in FIG. 5 during the assembly of an electrochromic glazing according to FIG. 1.

FIGS. 6A and 6B illustrate the pre-assembly and assembly stages for forming an electrochromic glazing of the type described in FIG. 1 by the apparatus shown in FIG. 5. As noted above, for the sake of clarity, the various features of the invention are not drawn to scale. Upon opening the apparatus, a silicone sheet 26 about 1 mm in thickness is placed on lower disk 15 to prevent possible abrasion to the bottom surface of "lower" glass support sheet 1. Support sheet 1 is then coated with electroconductive layer 2, electrochromic material 3 and electrolyte 4 (layers 2, 3, 4 are not shown in FIGS. 6A, 6B), and placed on the silicone sheet. A butyl rubber spacer cord 8, oriented according to one or the other of the variations represented in FIGS. 2 or 3, is placed around the periphery of coated support sheet 1.

Second glass support plate 7 is also provided with an electroconductive layer 6. A layer of electrochromic material 5 (not shown) is then coated upon the layer stack on first coated support sheet 1. Membrane 17 is placed above the laminate and the upper disk is connected to lower disk 15 by sealing means such as bolts, for example, to ensure a tight fit.

During the preassembly stage, the laminate assembly is subjected to a vacuum, as indicated in FIG. 6A, by simultaneously placing under vacuum the two chambers 18 and 19 through valves connected to orifices 20, 21. To make the degassing operation more efficient, disk 15 may be heated by heating system 24 at a temperature compatible with that of the electrolyte.

After a time ranging from several minutes to several hours, the glazing is assembled as represented in FIG. 6B. While continuing to heat disc 15, upper chamber 18 is pressurized through orifice 21, which is connected by its corresponding valve system to a source of compressed gas delivering a pressure of at most 12 atmospheres (or about $12 \cdot 10^5$ Pa), while lower chamber 19, containing the glazing, remains under vacuum.

Due to the effect of the pressure difference between two chambers 18 and 19, seal 8, already softened by the heat during the pre-assembly stage, is crushed, and the two coated support plates are assembled, with the pressure being transmitted by silicone membrane 17. Once this operation is finished, heater 24 is switched off and cooling circuit 25 is put into operation. As soon as the metal discs have returned to room temperature, the assembled glazing can be recovered by dismantling the device. The pressurizing time is adjusted experimentally as a function of the heating temperature, taking into account the nature of the electrolyte.

It should be noted that with the above-described apparatus is also capable of assembling curved support plates, since the pressure is transmitted with the use of a flexible membrane. The assembly of such curved support plates consequently requires a modification of the inner space of the assembly apparatus, in particular by correspondingly curving the surfaces of lower disk 15 and upper disk 14.

Further, it has been determined that where the two glass support sheets 1 and 7 are of different sizes, or where it is desired to assemble them in a staggered arrangement, a rigid wedge of suitable shape, partially covering the upper support plate, may be provided to avoid cantilevering the plates during the pressurization step, thus running the risk of breaking one of the coated support plates. In this manner, membrane 17 is prevented from resting on a free edge of the upper support plate when it is not supported by the lower support plate during the application of pressure to the laminate.

The advantages of the proposed apparatus for use in forming the glazing of the invention are thus readily apparent. Not only are the preassembly (i.e., degassing) and assembly stages performed at the same location, which simplifies those procedures and results in a saving of time, but in addition, it is no longer necessary to transfer the glazing from the degassing (preassembly) zone to the heating (assembly) zone, which can result, for example, in contamination of the glazing with oxygen or water vapor, as well as enhancing the chances for breakage.

Figure 4:
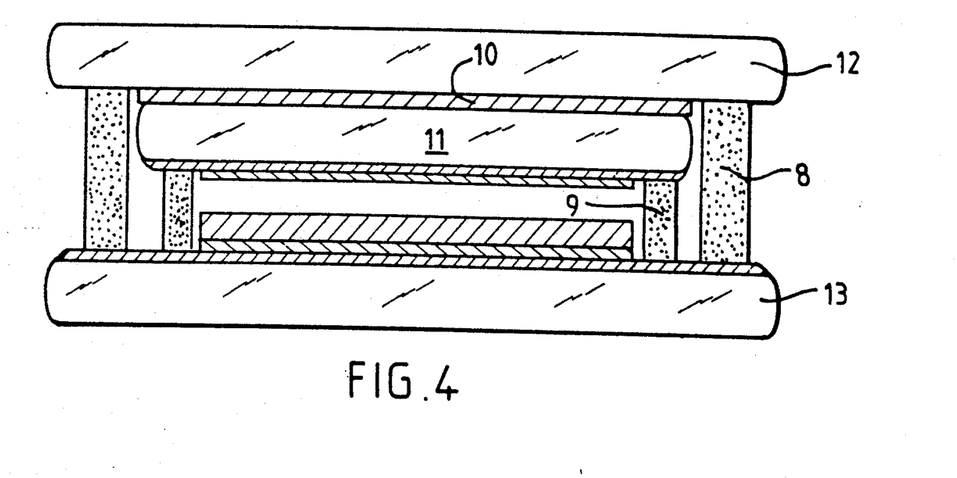
FIG. 4 is a sectional view of an electrochromic safety glazing in a pre-assembly orientation having a spacer member inserted therein.

FIG. 4 illustrates an electrochromic safety glazing formed according to the invention. Unlike the electrochromic glazing of FIG. 1, the safety glazing comprises two outer glass plates 12 and 13, an inner glass plate 11 of a dimension smaller than plates 12 and 13 and a polyvinyl butyryl layer 10 by which plate 11 is fused to plate 12. A temporary spacer 8 is placed between plates 13 and 12. Further, an additional spacer 9 may optionally be provided (inwardly of spacer 8) between plates 11 and 13, by leaving spaces so that any air present between the two outer sheets can be evacuated.

The two spacers may be formed of differing materials, for example, butyl rubber, polyurethane or polysulfide. The material used, however, should be selected so that both spacers flow at a temperature higher than room temperature, thus forming a double sealing barrier to prevent the passage of air and water vapor into the glazing.

The process of the invention is then carried out in the same manner as it would be for making an electrochromic glazing as described above with regard to FIG. 1, using an assembly device of the type illustrated in FIG. 5.

The table below sets forth the results of a comparative aging test between an electrochromic glazing assembled according to the process practiced in the prior art and one formed by the process of the invention. The table shows, as a function of time, the number of visible bubbles on a glazing surface measuring 0.15 m² at a temperature of 100° C.

| Period | Number of Visible Bubbles | |
| --- | --- | --- |
| | Standard Prior Art Assembly | Assembly According to the Invention |
| 4 h | 36 | 0 |
| 24 h | 150 | 0 |
| 100 h | greater than 400 | 0 |

These comparative test results demonstrate that the process of the invention makes it possible to reduce, preferably to zero, the number of air bubbles appearing in the glazing after up to 100 hours of exposure at high temperature. This constitutes a very appreciable improvement relative to the results obtained with the method of assembly previously practiced in the prior art.

We claim:

1. A method of forming an electrochromic glazing substantially free of air bubbles, said method comprising:

coating at least a portion of an inner surface of a first glass support plate with a first layer of an electroconductive material and stacking thereupon a layer of an electrochromic material;

coating at least a portion of an inner surface of a second glass support plate with a second layer of an electroconductive material and stacking thereupon a counterelectrode layer;

depositing a layer of an electrolyte material between said electrochromic layer and said counterelectrode layer;

aligning said first and said second coated glass support plates such that said coated surface portion of said first plate is proximally adjacent to, but not contacting, said coated portion of said second plate;

providing spacer means between said coated portions of said first and said second support plates for initially preventing contact between said coated surfaces, said spacer means defining an air-filled gap between said coated surfaces of said support plates;

subjecting said gap in a vacuum stage to a sufficient vacuum for a time sufficient to remove substantially all of the air therefrom;

heating said coated support plates to a temperature sufficient to render said electrolyte layer tacky, and to soften said spacer means sufficiently to permit joining together of said coated support plates to form a laminated glazing; and sandwiching said heated support plates together by the application of pressure to an uncoated portion of at least one of said plates, such that said spacer means flows sufficiently within the gap between said coated plates to form a seal therebetween substantially impervious to water vapor, to form a laminated electrochromic glazing, wherein said glazing is substantially free of air bubbles.

2. The process of claim 1 wherein said electrolyte material is deposited upon at least a portion of said electrochromic material stacked atop said first support plate.

3. The process of claim 1 wherein said electrolyte material is deposited upon at least a portion of said counterelectrode layer stacked atop said second support plate.

4. The process of claim 1 wherein said first and said second coated support plates are maintained at a distance of between about 2 and 10 mm apart by said spacer means prior to heating and sandwiching said support plates to form said glazing.

5. The process of claim 1 wherein said gap is subjected to a vacuum of less than about 13 Pa in the vacuum stage.

6. The process of claim 5 wherein said vacuum is about 1.3 Pa.

7. The process of claim 1 which further comprises extending the duration of the vacuum stage for a time sufficient to at least partially degas said electrolyte layer.

8. The process of claim 7 wherein the duration of said vacuum stage is between about 30 minutes and four hours.

9. The process of claim 7 which further comprises heating said coated support plates during said vacuum stage to a temperature of up to about 140° C. to further increase the efficiency of said degassing step.

10. The process of claim 1 which further comprises subjecting said coated glass support plates to a vacuum of less than about 13 Pa. while sandwiching them together to form said glazing.

11. A method of forming an electrochromic glazing substantially free of air bubbles, said method comprising:

coating at least a portion of an inner surface of a first glass support plate with a first layer of an electroconductive material and stacking these upon a layer of an electrochromic material;

coating at least a portion of an inner surface of a second glass support plate with a second layer of an electroconductive material and stacking thereupon a counterelectrode layer;

depositing a layer of an electrolyte material upon a layer selected from between said electrochromic layer and said counterelectrode layer;

aligning said first and said second coated glass support plates in adjacent relation such that said coated surface portion of said first plate is proximally adjacent to, but not contacting, said coated portion of said second plate;

providing spacer means between said coated portions of said first and said second support plates for initially preventing contact between said coated surfaces, said spacer means defining an air-filled gap between said coated portions of said support plates;

subjecting said gap to a vacuum of less than about 13 Pa while heating said coated support plates for a time between about 30 minutes and 4 hours to at least partially degas said electrolyte layer;

raising the temperature of said coated support plates to a temperature of about 140° C. and sandwiching said coated layers together under a vacuum of less than about 13 Pa. by the application of pressure to an uncoated portion of at least one of said plates, such that said spacer means flows sufficiently within the gap between said coated plates to form a seal therebetween substantially impervious to water vapor, to form a laminated electrochromic glazing, wherein said glazing is substantially free of air bubbles.

* * * * *